US012560175B1

(12) United States Patent

Zhu

(10) Patent No.: US 12,560,175 B1
(45) Date of Patent: *Feb. 24, 2026

(54) FAN

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/014,733

(22) Filed: Jan. 9, 2025

(51) Int. Cl.
| | |
|---|---|
| *F04D 25/16* | (2006.01) |
| *F04D 25/06* | (2006.01) |
| *F04D 27/00* | (2006.01) |
| F04D 19/00 | (2006.01) |
| H02K 11/30 | (2016.01) |

(52) U.S. Cl.
CPC ....... *F04D 25/166* (2013.01); *F04D 25/0693* (2013.01); *F04D 27/004* (2013.01); *F04D 19/002* (2013.01); *H02K 11/30* (2016.01); *H02K 2211/03* (2013.01)

(58) Field of Classification Search
CPC .. F04D 19/002; F04D 25/0693; F04D 25/166; F04D 27/004; F04D 29/4253; F04D 29/703; H02K 11/30; H02K 11/33; H02K 2211/00; H02K 2211/03; H02K 16/00
See application file for complete search history.

(56) References Cited

U.S. PATENT DOCUMENTS 4,160,576 A * 7/1979 Vettori ................. F04D 29/646
439/527
4,734,015 A * 3/1988 Wrobel ............... F04D 25/0613
415/222
5,005,680 A * 4/1991 Satoh .................... B60W 10/06
192/3.62
5,146,765 A * 9/1992 Waters ...................... A61F 7/02
62/531
5,411,371 A * 5/1995 Chen ..................... F04D 25/105
416/100

(Continued)

FOREIGN PATENT DOCUMENTS

CN 115434940 A * 12/2022 ............. F04D 25/08

OTHER PUBLICATIONS

Variable output switches (Year: 2008).*
Dimmer Knob Types Replacement Options Oct. 21, 2020 (Year: 2020).*

*Primary Examiner* — Charles G Freay
*Assistant Examiner* — Joseph S. Herrmann
(74) *Attorney, Agent, or Firm* — Hemisphere Law, PLLC

(57) ABSTRACT

The present disclosure provides a fan. The fan includes a fan main body, a circuit board, and an operating element. The circuit board is provided with a stepless adjusting member. The operating element is connected to the stepless adjusting member. The fan main body includes a first motor electrically connected to the circuit board and a fan blade connected to the first motor. The circuit board adjusts power output to the first motor when the operating element rotates and operates the stepless adjusting member. So as to adjust a rotating speed of the first motor. In this way, the user can adjust a desired wind speed of the fan blade according to a need, which solves the problem that the wind speed of the existing fan cannot be freely adjusted and improves the operating performance and the user experience.

16 Claims, 14 Drawing Sheets

(56)     References Cited

U.S. PATENT DOCUMENTS

| | | | | |
|---|---|---|---|---|
| 5,752,759 | A * | 5/1998 | Pizzo | G05G 1/105 |
| | | | | 362/571 |
| 5,857,242 | A * | 1/1999 | Pizzo | G05G 1/12 |
| | | | | 16/441 |
| 6,666,647 | B1 * | 12/2003 | Trask | F04D 25/08 |
| | | | | 416/246 |
| 11,536,294 | B1 * | 12/2022 | Zhu | F04D 29/046 |
| 2004/0150571 | A1 * | 8/2004 | Deng | G06F 1/181 |
| | | | | 343/702 |
| 2005/0053492 | A1 * | 3/2005 | Su | F04D 27/004 |
| | | | | 417/423.3 |
| 2008/0084640 | A1 * | 4/2008 | Ching | H01H 19/62 |
| | | | | 361/31 |
| 2014/0369867 | A1 * | 12/2014 | Prior | F04D 13/068 |
| | | | | 417/423.15 |
| 2023/0243368 | A1 * | 8/2023 | Zhu | F04D 25/0693 |
| | | | | 415/213.1 |
| 2024/0093693 | A1 * | 3/2024 | Zhu | F04D 29/703 |

* cited by examiner

151

15

152

11

111

113

112

FAN

TECHNICAL FIELD

The present disclosure relates to the technical field of cooling devices, and in particular, to a fan.

BACKGROUND

As is well known, a fan is a device used for cooling. At present, in existing fans, buttons are usually used to adjust wind speeds. A fan usually has three grades of wind speeds: A first grade is a low wind speed; a second grade is a medium wind speed; and a third grade is a high wind speed. The wind speeds are at different grades in this manner, so that the wind speeds cannot be adjusted freely, which affects the user experience.

SUMMARY

The present disclosure aims to provide a fan, which solves the problem that the wind speed of the existing fan cannot be freely adjusted.

In order to solve the technical problem, the technical scheme provided by the present disclosure is as follows.

A fan includes a fan main body, a circuit board, and an operating element, wherein the circuit board is provided with a stepless adjusting member; the operating element is connected to the stepless adjusting member; the fan main body includes a first motor electrically connected to the circuit board and a fan blade connected to the first motor; and the circuit board adjusts power output to the first motor when the operating element rotates and operates the stepless adjusting member.

Further, the stepless adjusting member is a potentiometer or a rotary encoder switch.

Further, the operating element is provided with a first insertion slot matched with a rotating handle in the rotary encoder switch, and the rotating handle of the rotary encoder switch is at least partially arranged in the first insertion slot.

Further the rotating handle is in an interference fit with the first insertion slot; an outer side wall of the rotating handle in the rotary encoder switch is at least partially a plane; two first convex blocks spaced apart from each other are formed on a side wall of the first insertion slot; and surfaces, away from a side wall surface of the first insertion slot, of the two first convex blocks are in contact with the plane.

Further, skidproof stripes are arranged on an outer surface of the operating element.

Further, the fan further includes a base rotatably connected to the fan main body.

Further, the fan further includes a second motor arranged on the fan main body or the base to drive the fan main body to rotate, wherein the second motor is electrically connected to the circuit board; and the stepless adjusting member is a press switch encoder;

a switch inside the press switch encoder is closed when the operating element is pressed; and the circuit board controls the second motor to rotate according to the closure of the switch in the press switch encoder.

Further, the circuit board includes a control board arranged on the base and an adapter board electrically connected to the control board; the stepless adjusting member is arranged on the adapter board; a first via hole corresponding to a position of the rotating handle is formed in the base; the rotating handle passes through the first via hole from the inside of the base and is connected to the operating element; the second motor is arranged on the base; and an output shaft of the second motor is connected to the fan main body.

Further, a quantity of the fan blade is two, and the fan blades are spaced apart from each other; a quantity of the first motor is two; and each first motor is connected to one fan blade.

Further, the two fan blades include an upper fan blade and a lower fan blade which are spaced apart from each other.

Further, the fan main body further includes a front mesh cover and a rear mesh cover connected to the front mesh cover to form an intermediate cavity; the fan blades are arranged in the intermediate cavity; the first motors are arranged on the rear mesh cover;

a wiring slot is formed on a back surface of the rear mesh cover; a cover plate is set at a position of the wiring slot; a first wiring hole is formed in a bottom of the wiring slot; a second wiring hole is formed in the base; the circuit board is connected to the first motors through a wire; and one end of the wire is arranged in the wiring slot through the second wiring hole and the first wiring hole in sequence.

Further, mounting slots for mounting the first motors are respectively formed in two ends of the wiring slot on the back surface of the rear mesh cover; a second via hole communicated with the mounting slots is formed in an inner wall of the rear mesh cover; the first motors are mounted in the mounting slots; output shafts of the first motors are connected to the fan blades through the second via hole; the first wiring hole is located on the mounting slots;

the cover plate includes two first cover bodies used in conjunction with the two mounting slots, and a connecting plate body located between the two first cover bodies; the two first cover bodies are respectively clamped in the two mounting slots; and the connecting plate body is covered at a notch of the wiring slot.

Further, the front mesh cover includes two circular mesh covers corresponding to the positions of the two fan blades and an intermediate mesh cover located between the two circular mesh covers; the intermediate mesh cover is clamped to a front side of the rear mesh cover;

a plurality of second convex blocks are arranged on outer side walls of the circular mesh covers in a spacing manner; a clamping slot and a gap communicated with the clamping slot are arranged an inner side wall of the rear mesh cover; and the second convex blocks are rotatably arranged in the clamping slot after entering the gap.

Further, the fan main body further includes an air deflecting mesh component; the air deflecting mesh component includes a pressing frame body, a connecting rod, upper and lower air deflectors arranged on the connecting rod in a spacing manner, and a peripheral frame body connected to the rear mesh cover;

the front mesh cover is located inside the peripheral frame body; two ends of the air deflectors are provided with rotating parts; the pressing frame body is connected to the peripheral frame body to form two columns of rotating holes spaced apart from each other; the rotating parts are inserted into the rotating holes; and a poke rod for adjusting an angle of the air deflector is arranged on one side, far from the fan blades, of at least one of the air deflectors.

Further, connectors are arranged on two sides of the rear mesh cover; and one end of each connector is detachably connected to the peripheral frame body.

Further, strip-shaped holes are formed in two sides of the peripheral frame body; a first clastic buckle used in conjunction with the strip-shaped hole is arranged at one end of each connector; lengths of the first elastic buckles match lengths of the strip-shaped holes; and the first clastic buckles are arranged in the strip-shaped holes from an inner side of the peripheral frame body.

Further, an embedding part is perpendicularly arranged at one end, far from the first clastic buckle, of each connector, and a plurality of second elastic buckles are arranged on the embedding part; second insertion slots are formed in two sides of the rear mesh cover; bayonets are arranged on the second insertion slots; the embedding parts are arranged in the second insertion slots; and the second elastic buckles are arranged in the bayonets.

The present disclosure also provides a clamping fan, including the fan described above.

The present disclosure also provides a neck fan, including the fan described above.

The present disclosure also provides a handheld fan, including the fan described above.

Compared with the prior art, the present disclosure has the beneficial effects below: In this present disclosure, by the arrangement of the stepless adjusting member and the operating element, the stepless adjusting member is adjusted when a user rotates the operating member, so that the circuit board can adjust the power output to the first motor, so as to adjust a rotating speed of the first motor. In this way, the user can adjust a desired wind speed of the fan blade according to a need, which solves the problem that the wind speed of the existing fan cannot be freely adjusted and improves the operating performance and the user experience.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 13, the embodiments of the present disclosure provide a fan.

Figure 1:
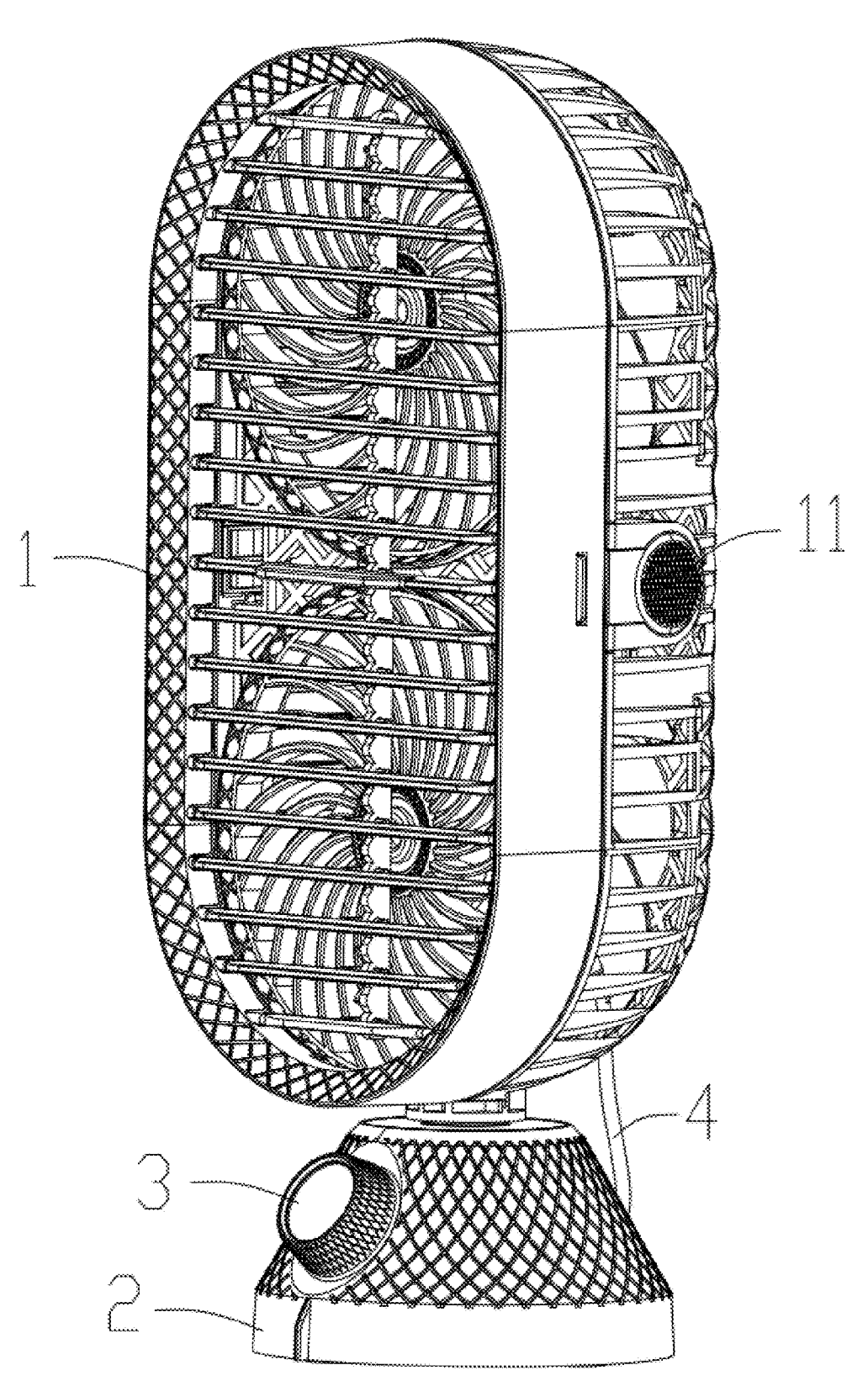
FIG. 1 is a three-dimensional diagram of the present disclosure.
Figure 2:
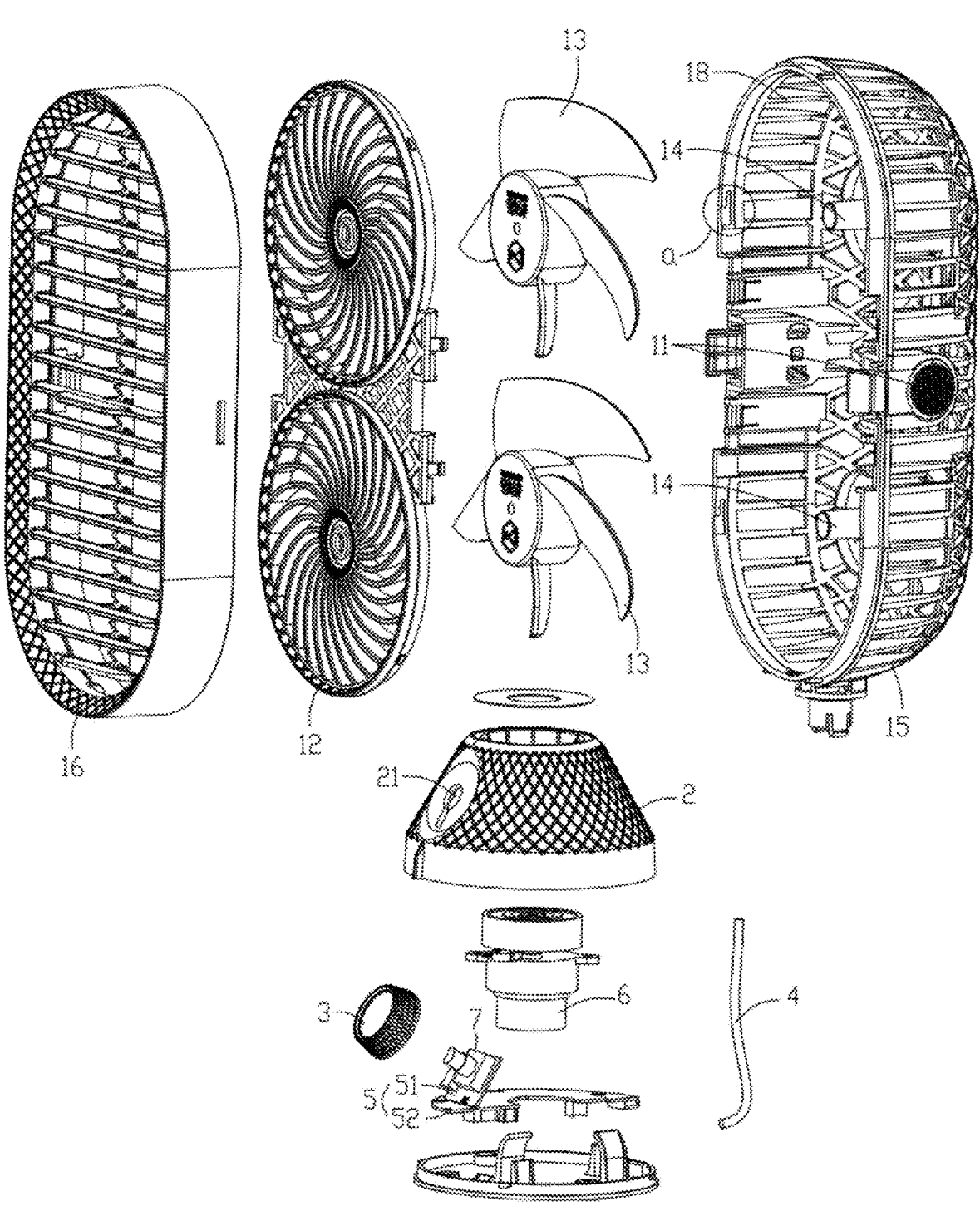
FIG. 2 is an exploded view of the present disclosure.

Referring to FIG. 1 and FIG. 2, the fan includes a fan main body 1, a circuit board 5, and an operating element 3. The circuit board 5 is provided with a stepless adjusting member 7; the operating element 3 is connected to the stepless adjusting member 7; and the fan main body 1 includes a first motor 14 electrically connected to the circuit board 5 and a fan blade 13 connected to the first motor 14. The circuit board 5 adjusts power output to the first motor 14 when the operating element 3 rotates and operates the stepless adjusting member 7.

In this embodiment, by the arrangement of the stepless adjusting member 7 and the operating element 3, the stepless adjusting member 7 is adjusted when a user rotates the operating member 3, so that the circuit board 5 can adjust the power output to the first motor 14, so as to adjust a rotating speed of the first motor 14. In this way, the user can adjust a desired wind speed of the fan blade 13 according to a need, which solves the problem that the wind speed of the existing fan cannot be freely adjusted and improves the operating performance and the user experience.

Specifically, the stepless adjusting member 7 can be a potentiometer, a rotary encoder switch, and the like. When the stepless adjusting element 7 is the potentiometer, rotating the operating element 3 can adjust a resistance of the potentiometer, and the circuit board 5 adjusts the power output to the first motor 14 according to a change in the resistance. When stepless adjusting member 7 is the rotary encoder switch, rotating the operating element 3 can adjust the rotary encoder switch. In this case, an output end of an encoder will feed back a phase difference to the circuit board 5, and the circuit board 5 adjusts the power output to the first motor 14 according to the phase difference.

Figure 4:
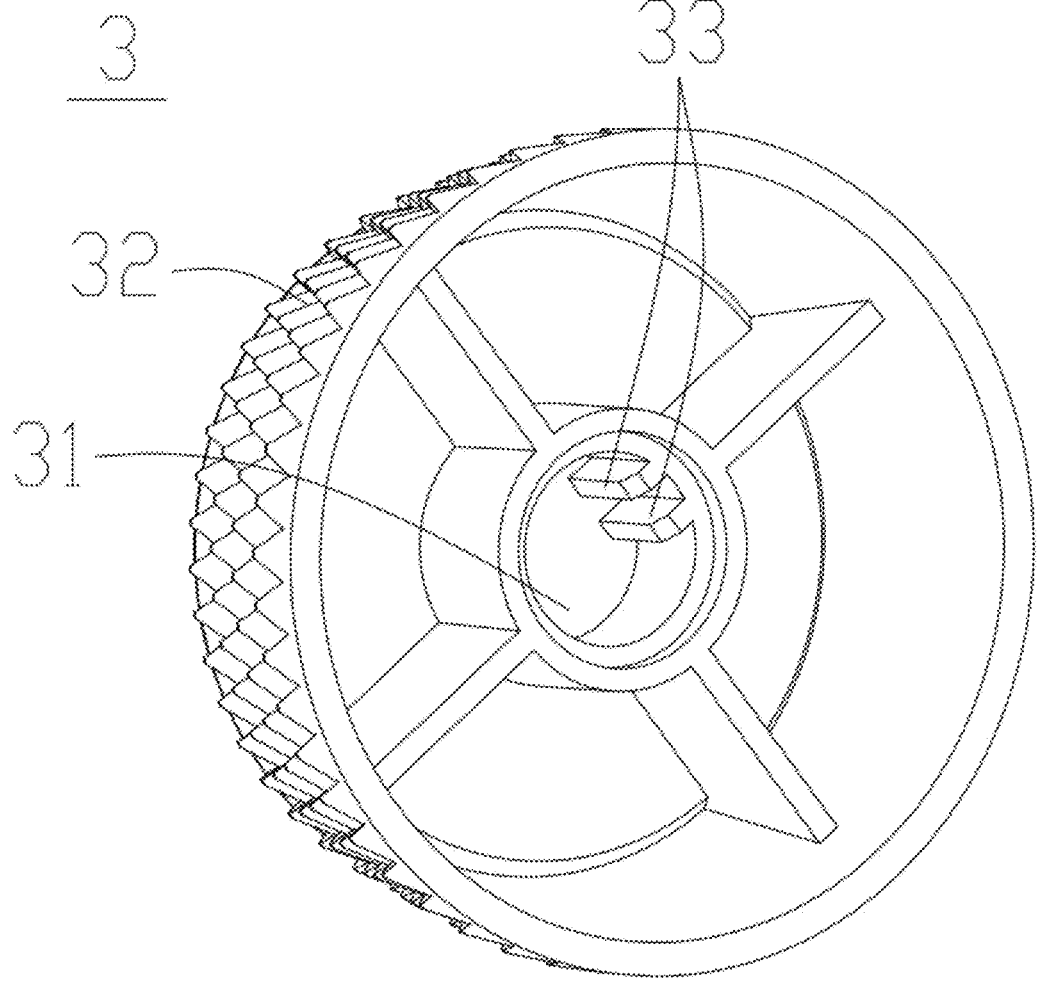
FIG. 4 is a structural diagram of an operating element of the present disclosure.
Figure 5:
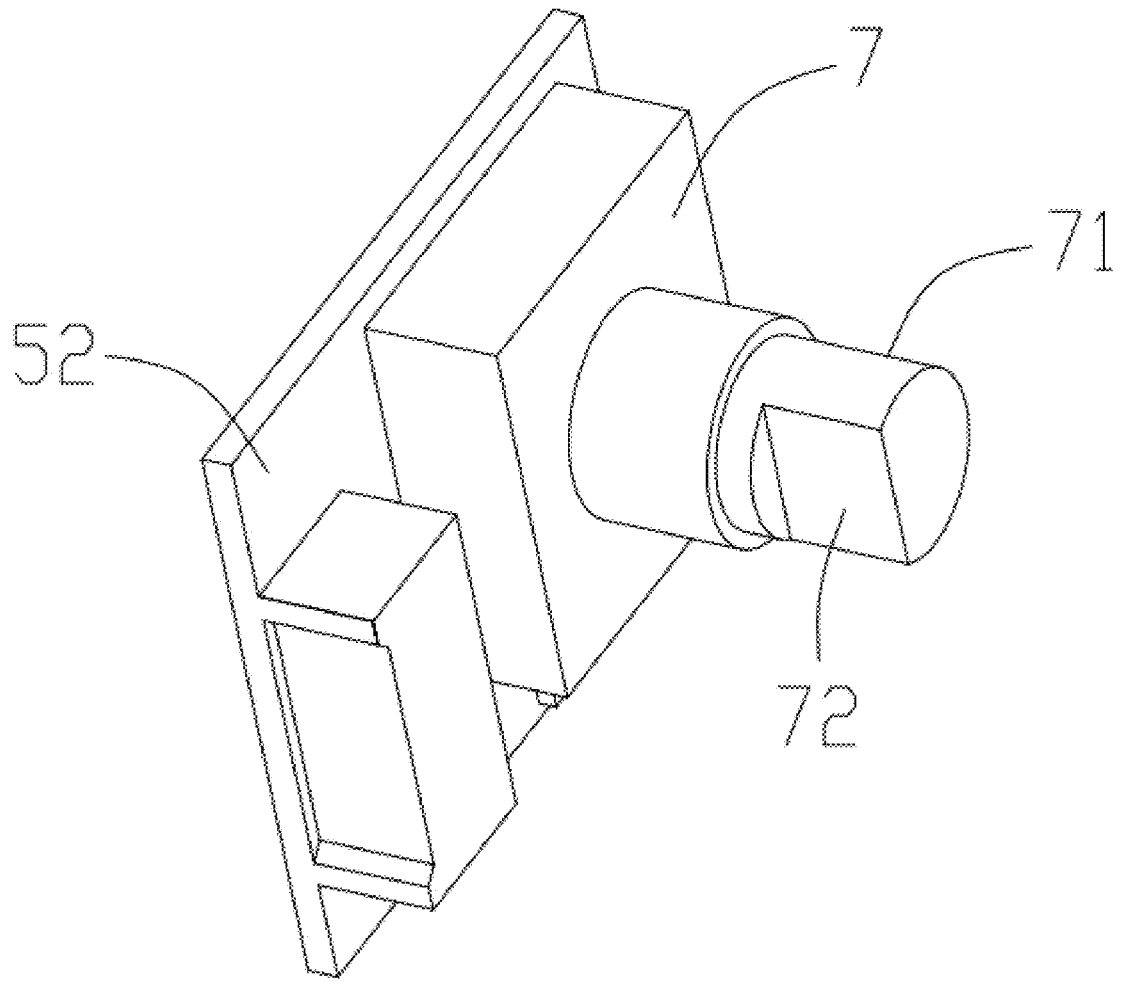
FIG. 5 is an assembling diagram of an adapter board and a stepless adjusting member of the present disclosure.

In an embodiment, referring to FIG. 4 and FIG. 5, when the stepless adjusting member 7 is the rotary encoder switch, the operating element 3 is provided with a first insertion slot 31 matched with a rotating handle 71 in the rotary encoder switch, and the rotating handle 71 of the rotary encoder switch is at least partially arranged in the first insertion slot 31, so that when the operating element 3 is rotated, the phase difference output by the rotary encoder switch can be adjusted.

Specifically, the rotating handle 71 is in an interference fit with the first insertion slot 31, so as to stably connect the rotating handle 71 to the first insertion slot 31.

In an embodiment, an outer side wall of the rotating handle 71 in the rotary encoder switch is at least partially a plane 72; two first convex blocks 33 spaced apart from each other are formed on a side wall of the first insertion slot 31; and surfaces, away from a side wall surface of the first insertion slot 31, of the two first convex blocks 33 are in contact with the plane 72, so that when the operating element 3 is effectively rotated, the rotating handle 71 on the rotary encoder switch can be driven to rotate.

In an embodiment, skidproof stripes 32 are arranged on an outer surface of the operating element 3, so as to increase a friction force during the rotation of the operating element 3, which facilitates the rotation of the operating element 3.

Figure 12:
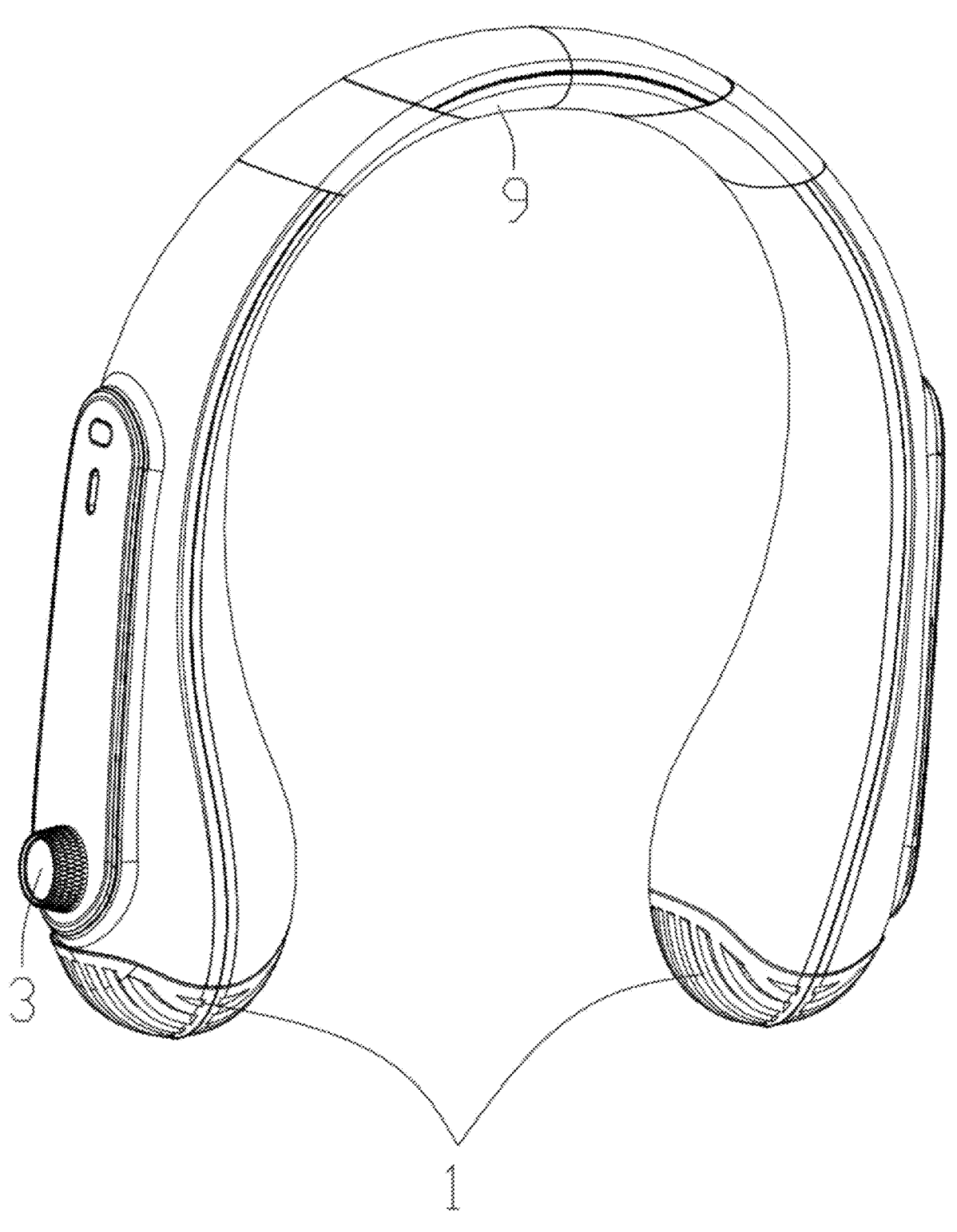
FIG. 12 is a schematic diagram showing that a fan is a neck fan according to the present disclosure.
Figure 13:
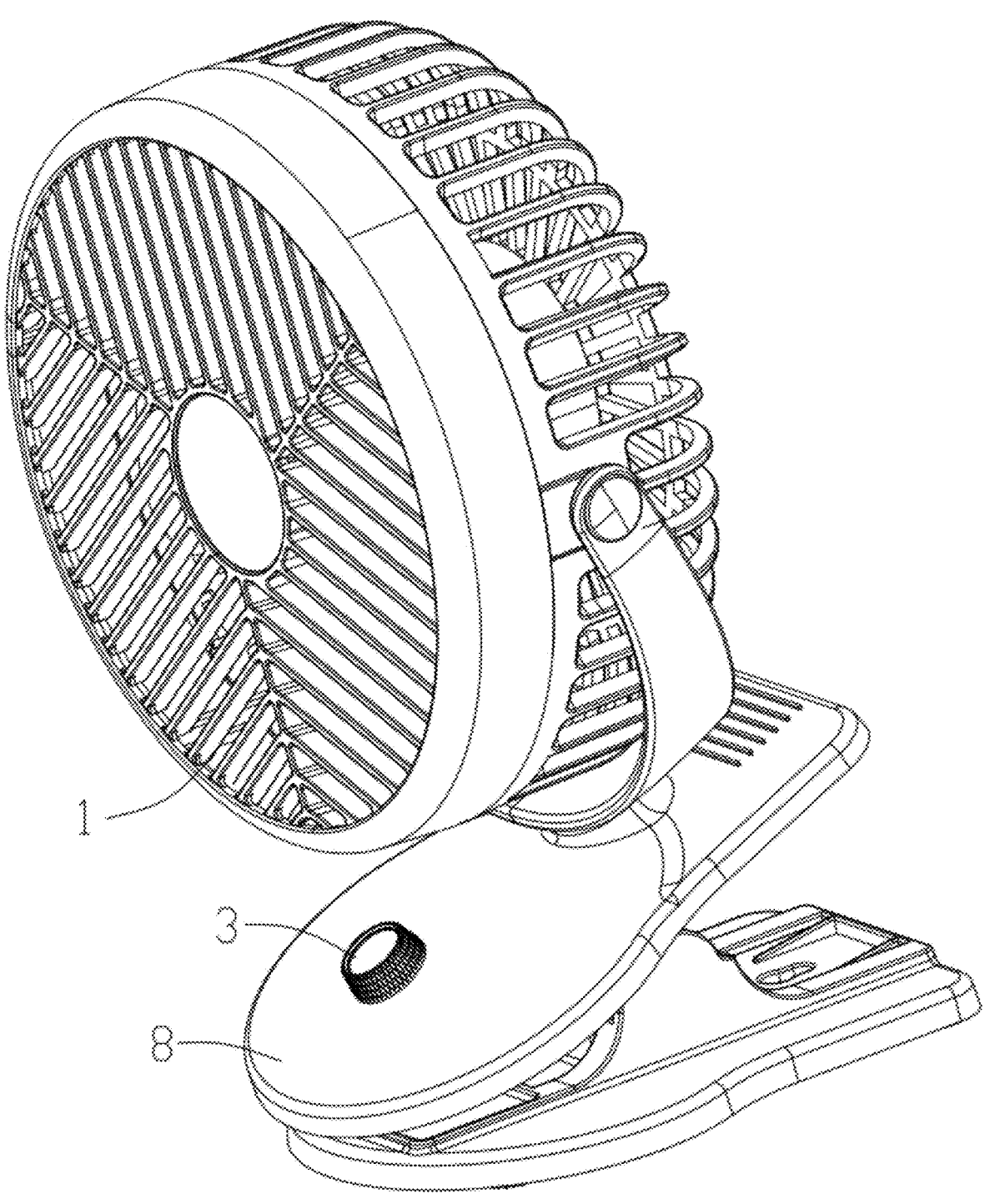
FIG. 13 is a schematic diagram showing that a fan is a clamping fan according to the present disclosure.
Figure 14:
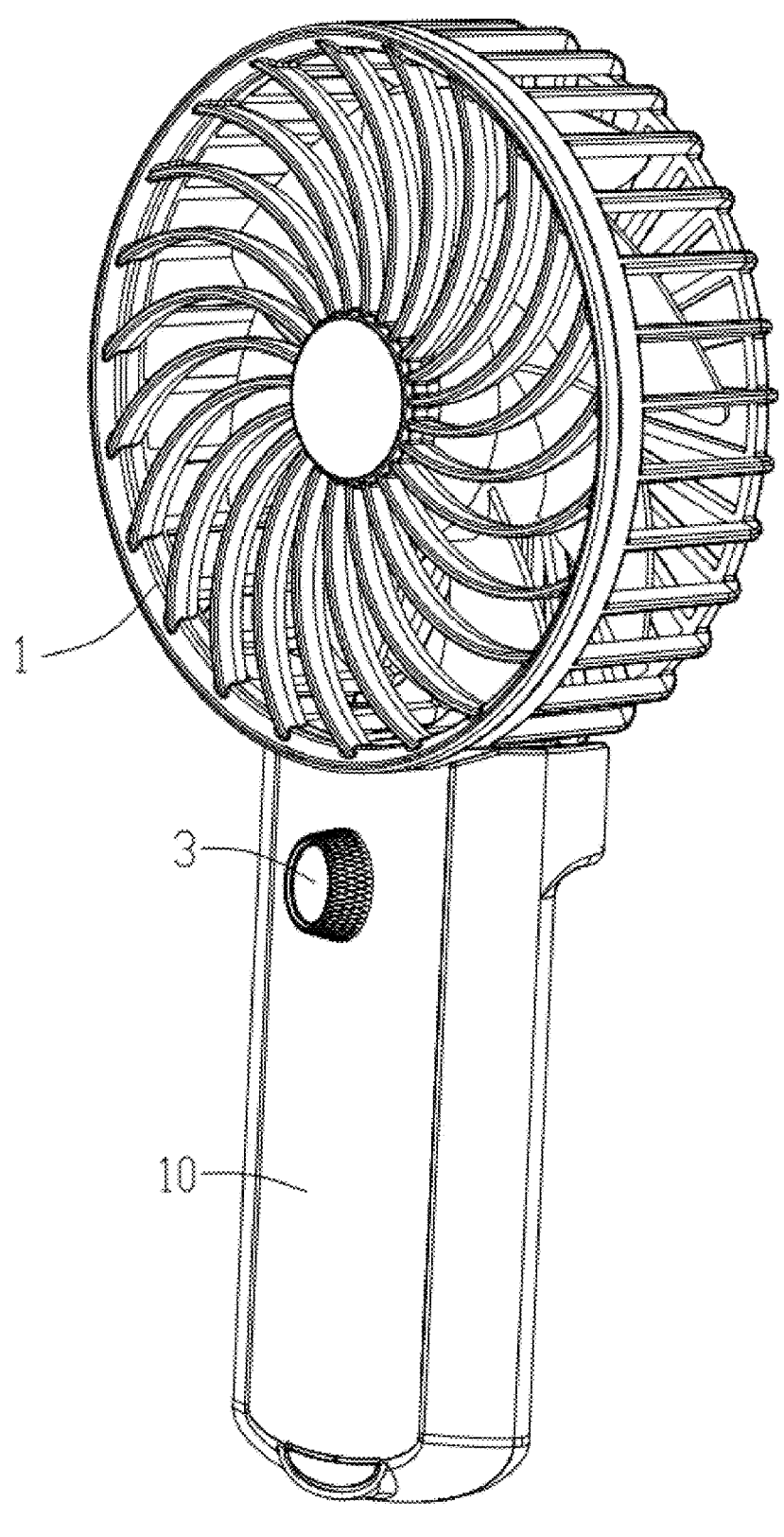
FIG. 14 is a schematic diagram showing that a fan is a handheld fan according to the present disclosure.

In any of the above embodiments, referring to FIG. 13, the fan can be a clamping fan. That is, a clamping member 8 is arranged at a bottom of the fan main body 1. The fan in this embodiment can be clamped at a desired position through the clamping member 8. The circuit board 5 and the stepless adjusting member 7 can be arranged on the fan main body 1 or the clamping member 8. In other embodiments, refer-ring to FIG. 14, the fan can also be a handheld fan. That is, a handheld part 10 is arranged at a bottom of the fan main body 1, and the circuit board 5 and the stepless adjusting member 7 can be arranged on the handheld part 10. Or, the fan can also be a neck fan. As shown in FIG. 12, the neck fan includes a hanging member 9 and two fan main bodies 1 respectively located at two ends of the hanging member 9. The circuit board 5 and the stepless adjusting member 7 can be arranged on the fan main bodies 1 or the hanging member.

Figure 6:
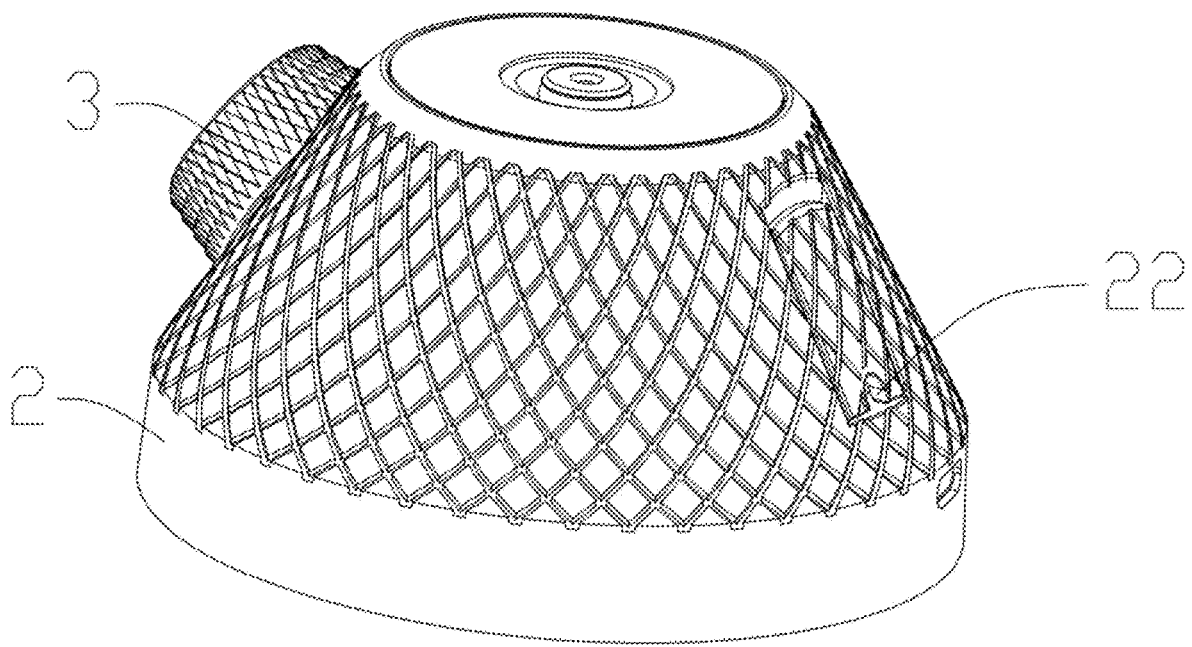
FIG. 6 is a schematic diagram of a base of the present disclosure.

In an embodiment, referring to FIG. 1, FIG. 2, and FIG. 6, the fan further includes a base 2 rotatably connected to the fan main body 1. Through the base 2, it is convenient for placing the fan in this embodiment.

In an embodiment, the fan further includes a second motor 6 arranged on the fan main body 1 or the base 2 to drive the fan main body 1 to rotate; the second motor 6 is electrically connected to the circuit board 5; and the stepless adjusting member 7 is a press switch encoder. A switch inside the press switch encoder is closed when the operating element 3 is pressed; and the circuit board 5 controls the second motor 6 to rotate according to the closure of the switch in the press switch encoder. Thus, when the user presses the operating element 3, the fan main body 1 can be controlled to swing.

In an embodiment, to achieve the compactness of the structure of this embodiment, the circuit board 5 includes a control board 52 arranged on the base 2 and an adapter board 51 electrically connected to the control board 52; the step-less adjusting member 7 is arranged on the adapter board 51; a first via hole 21 corresponding to a position of the rotating handle 71 is formed in the base 2; and the rotating handle 71 passes through the first via hole 21 from the inside of the base 2 and is connected to the operating element 3. The second motor 6 is arranged on the base 2; and an output shaft of the second motor 6 is connected to the fan main body 1.

In an embodiment, referring to FIG. 2, a quantity of the fan blade 13 is two, which are spaced apart from each other. A quantity of the first motor 14 is two, and each first motor is connected to one fan blade 13. By the arrangement of the two fan blades 13, a blowing range of the fan can be enlarged to improve the cooling effect.

Specifically, the two fan blades 13 include an upper fan blade and a lower fan blade which are spaced apart from each other, which can enlarge upper and lower blowing ranges. Of course, in other embodiments, the two fan blades 13 can also include a left fan blade and a right fan blade which are spaced apart from each other.

Figure 7:
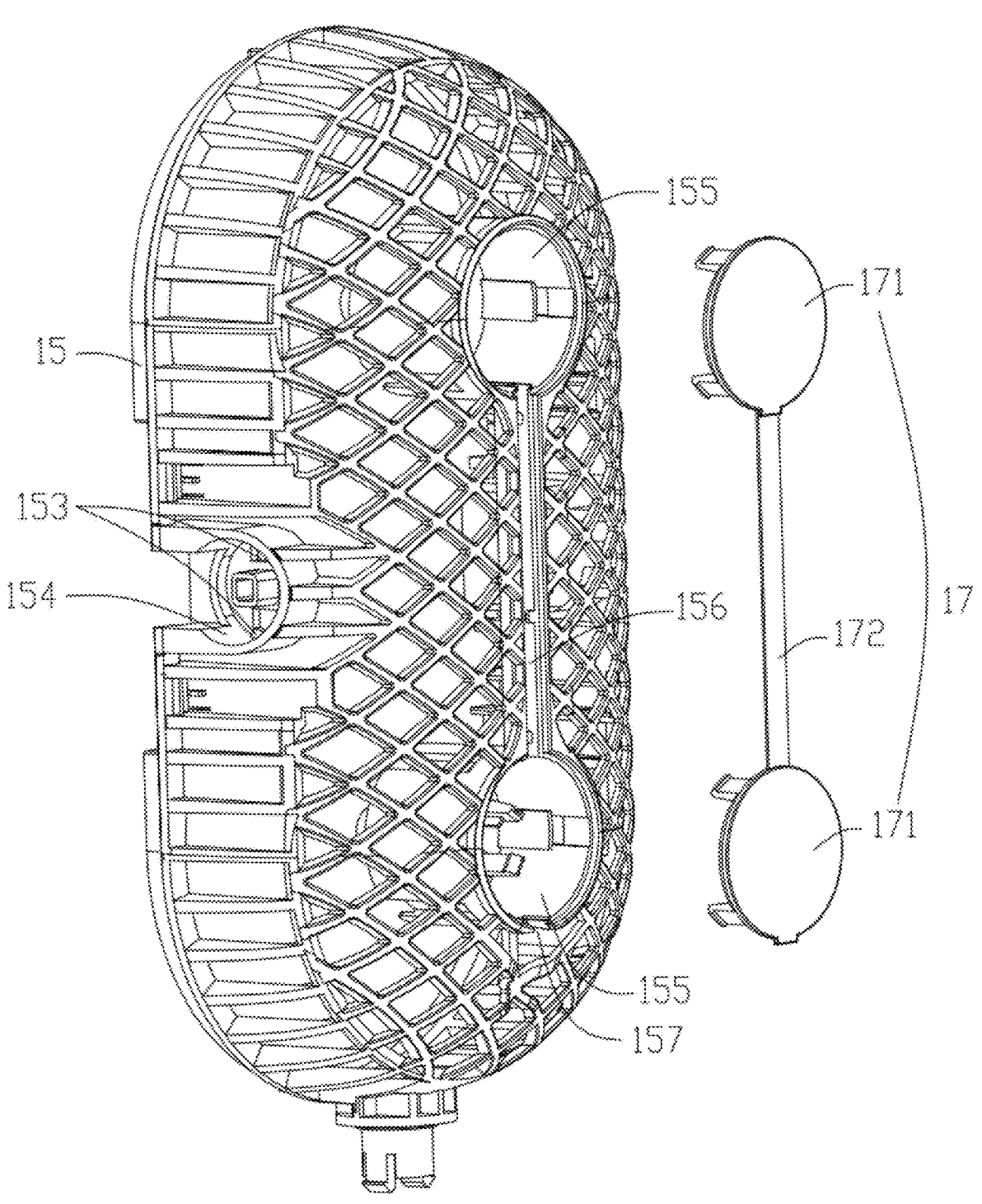
FIG. 7 is an exploded diagram of a rear mesh cover and a cover plate of the present disclosure.
Figure 8:
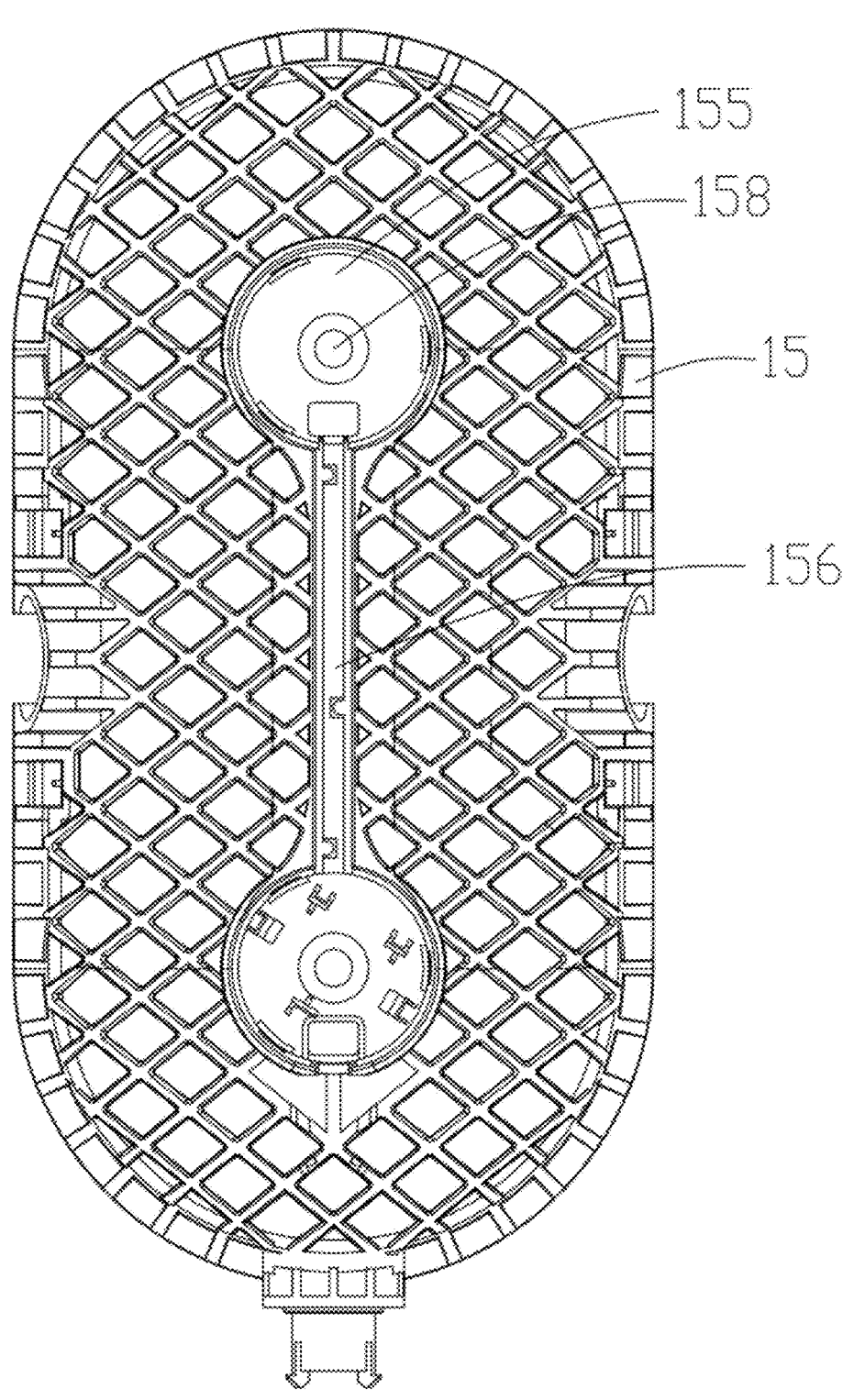
FIG. 8 is a schematic diagram of a rear mesh cover of the present disclosure.

In an embodiment, referring to FIG. 2, FIG. 7, and FIG. 8, the fan main body 1 further includes a front mesh cover 12 and a rear mesh cover 15 connected to the front mesh cover 12 to form an intermediate cavity 18; the fan blades 13 are arranged in the intermediate cavity 18; and the first motors 14 are arranged on the rear mesh cover 15. A wiring slot 156 is formed on a back surface of the rear mesh cover 15; a cover plate 17 is arranged at a position of the wiring slot 156; a first wiring hole 157 is formed in a bottom of the wiring slot 156; a second wiring hole 22 is formed in the base 2; the circuit board 5 is connected to the first motors 14 through a wire 4; and one end of the wire 4 is arranged in the wiring slot 156 through the second wiring hole 22 and the first wiring hole 157 in sequence, so as to achieve electrical connection between the circuit board 5 and the first motors 14. By the use of the wiring slot 156 for wiring, the wire 4 can be protected from being pulled, and the beauty of the fan of this embodiment can be improved.

In an embodiment, when the two fan blades 13 include an upper fan blade and a lower fan blade which are spaced apart from each other, mounting slots 155 for mounting the first motors 14 are respectively formed in two ends of the wiring slot 156 on the back surface of the rear mesh cover 15; a second via hole 158 communicated with the mounting slots 155 is formed in an inner wall of the rear mesh cover 15; the first motors 14 are mounted in the mounting slots 155; output shafts of the first motors 14 are connected to the fan blades 13 through the second via hole 158; the first wiring hole 157 is located on the mounting slots 155. In this way, one end of the wire 4 can enter the mounting slot 155 located at the bottom through the first wiring hole 157 after coming out of the base 2, and is electrically connected to the first motor 14 located below, and the wire 4 connected to the other first motor 14 enters the mounting slot 155 located above through the wiring slot 156 and is electrically con-nected to the other first motor 14.

The cover plate 17 includes two first cover bodies 171 used in conjunction with the two mounting slots 155, and a connecting plate body 172 located between the two first cover bodies 171; the two first cover bodies 171 are respec-tively clamped in the two mounting slots 155; and the connecting plate body 172 is covered at a notch of the wiring slot 156, so as to fix the whole cover plate 17. The two mounting slots 155 and the wiring slot 156 are covered by the cover plate 17 to play a role of protecting the two first motors 14 and the wire 4.

Figure 9:
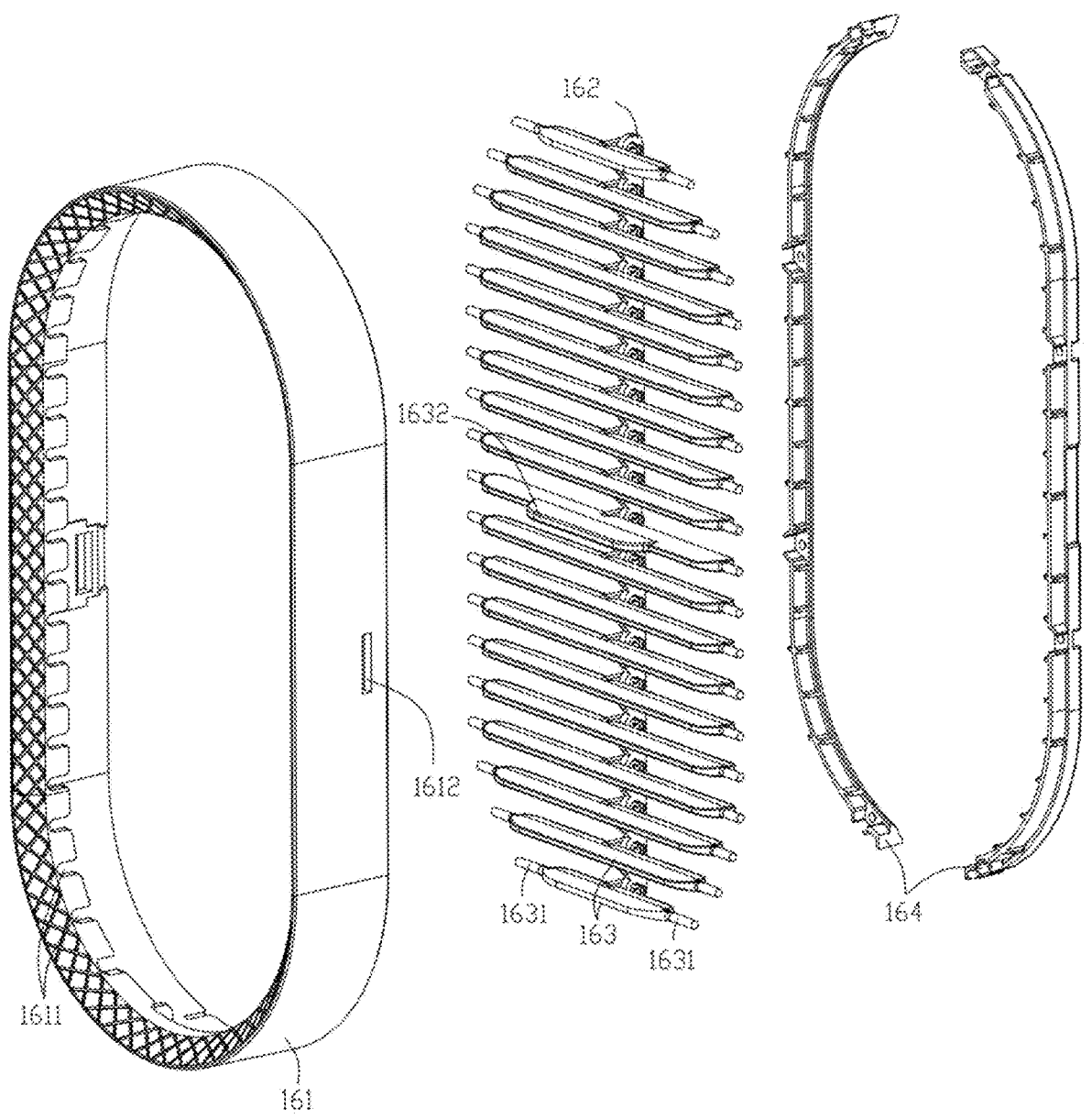
FIG. 9 is an exploded view of an air deflecting mesh component of the present disclosure.

In an embodiment, referring to FIG. 9, the fan main body 1 further includes an air deflecting mesh component 16; the air deflecting mesh component 16 includes a pressing frame body 164, a connecting rod 162, upper and lower air deflectors 163 arranged on the connecting rod 162 in a spacing manner, and a peripheral frame body 161 connected to the rear mesh cover 15; the front mesh cover 12 is located inside the peripheral frame body 161; two ends of the air deflectors 163 are provided with rotating parts 1631; the pressing frame body 164 is connected to the peripheral frame body 161 to form two columns of rotating holes 1611 spaced apart from each other; and the rotating parts 1631 are inserted into the rotating holes 1611, so as to achieve rotatable connection between the air deflecting mesh com-ponent 16 and the peripheral frame body. A poke rod for adjusting an angle of the air deflector 163 is arranged on one side, far from the fan blades 13, of at least one of the air deflectors 163. By means of upper and lower rotatable push members 1632, the angle of each air deflector 163 can be adjusted, so that it is convenient for the user to adjust a blowing angle.

Figure 10:
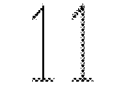
FIG. 10 is a structural diagram of a connector of the present disclosure.
Figure 10:
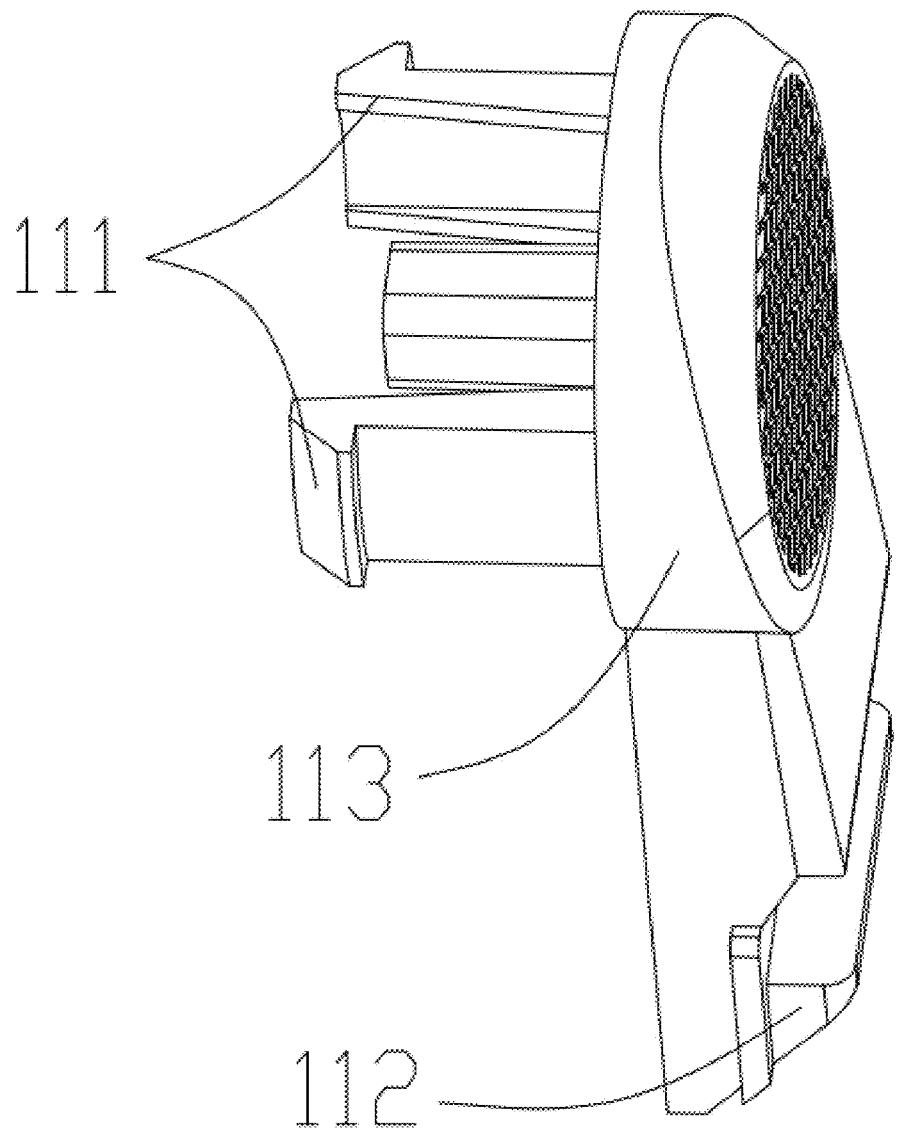

In an embodiment, referring to FIG. 7 and FIG. 10, connectors 11 are arranged on two sides of the rear mesh cover 15; and one end of each connector 11 is detachably connected to the peripheral frame body 161. The peripheral frame body 161 can be removed, so that it is convenient for the user to clean the air deflecting mesh component 16 and the front mesh cover 12.

Specifically, strip-shaped holes 1612 are formed in two sides of the peripheral frame body 161; a first elastic buckle 112 used in conjunction with the strip-shaped hole1612 is arranged at one end of each connector 11; and lengths of the first elastic buckles 112 match lengths of the strip-shaped holes 1612. The strip-shaped holes 1612 have certain lengths, which can improve the stability of connection between the peripheral frame body 161 and the rear mesh cover 15. The first elastic buckles 112 are arranged in the strip-shaped holes 1612 from an inner side of the peripheral frame body 161. In this case, the user can separate the first elastic buckles 112 from the strip-shaped holes 1612 by pressing the first elastic buckles 112, so as to remove the air deflecting mesh component 16.

In an embodiment, an embedding part 113 is perpendicularly arranged at one end, far from the first elastic buckle 112, of each connector 11, and a plurality of second elastic buckles 111 are arranged on the embedding part 113. Second insertion slots 154 are formed in two sides of the rear mesh cover 15; bayonets 153 are arranged on the second insertion slots 154; the embedding parts 113 are arranged in the second insertion slots 154; and the second elastic buckles 111 are arranged in the bayonets 153, which achieves connection of the connectors 11 to the rear mesh cover 15. Furthermore, by means of buckling, assembling is facilitated, and the production efficiency is improved.

Figure 3:
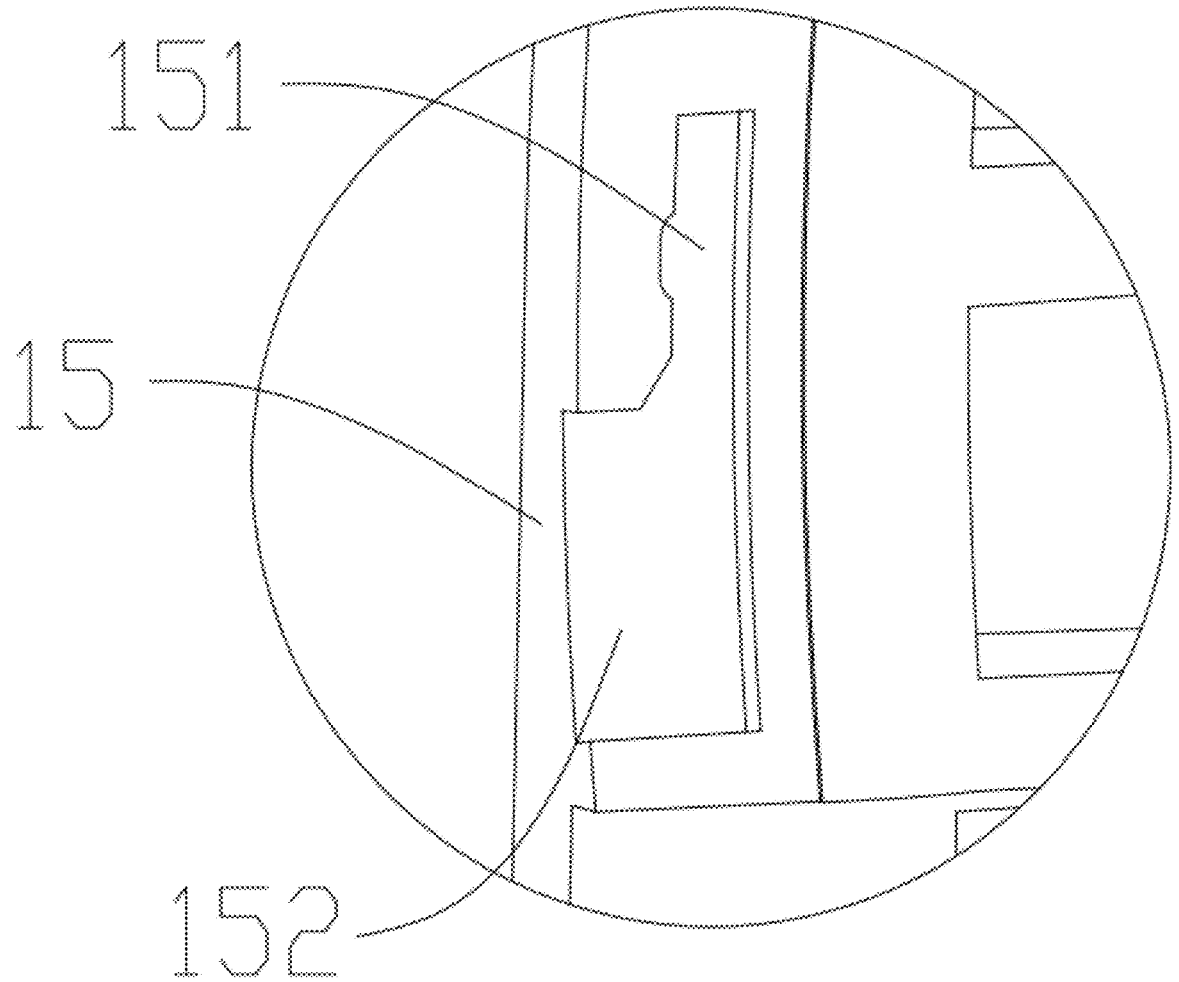
FIG. 3 is an enlarged view of region a in FIG. 2.
Figure 11:
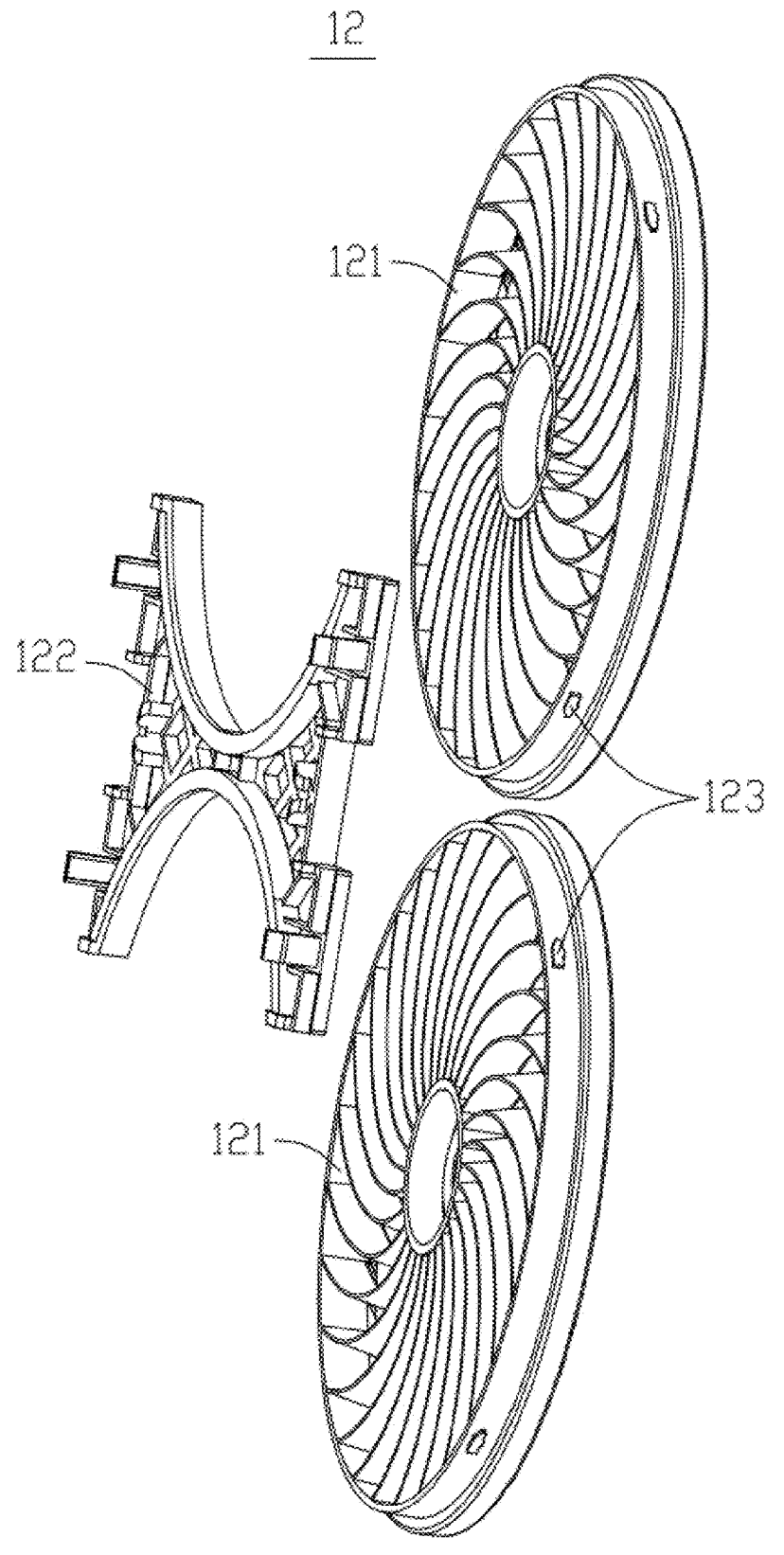
FIG. 11 is an exploded diagram of a front mesh cover of the present disclosure.

In an embodiment, referring to FIG. 3 and FIG. 11, the front mesh cover 12 includes two circular mesh covers 121 corresponding to the positions of the two fan blades 13 and an intermediate mesh cover 122 located between the two circular mesh covers 121; and the intermediate mesh cover 122 is clamped to a front side of the rear mesh cover 15. A plurality of second convex blocks 123 are arranged on outer side walls of the circular mesh covers 121 in a spacing manner; a clamping slot 151 and a gap 152 communicated with the clamping slot 151 are arranged an inner side wall of the rear mesh cover 15; and the second convex blocks 123 of the circular mesh covers 121 are rotatably arranged in the clamping slot 151 after entering the gap 152, which achieves detachable connection between the circular mesh covers 121 and the rear mesh cover 15. It is convenient for the user to remove the circular mesh covers 121 to clean the fan blades 13. Of course, in other embodiments, the front mesh cover 12 can be directly fixed to the rear mesh cover 15 through a buckle, a screw, or the like, which can also achieve the detachable connection between the front mesh cover 12 and the rear mesh cover 15.

It should be noted that the terms "include", "comprise", or any other variations thereof herein is intended to cover a non-exclusive inclusion, so that a processor, device, object, or method including a series of elements not only includes those elements, but also includes other elements not specifically listed, or includes inherent elements of this process, device, object, or method. Without more limitations, elements defined by the sentence "including one" does not exclude that there are still other same elements in the process, device, object, or method including these elements. In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A fan, comprising:
   a fan main body,
   a circuit board, and
   an operating element, wherein the circuit board is provided with a stepless adjusting member; the operating element is connected to the stepless adjusting member; the fan main body comprises a first motor electrically connected to the circuit board and a fan blade connected to the first motor;
   the circuit board adjusts power output to the first motor when the operating element rotates and operates the stepless adjusting member;
   wherein the fan main body comprises a front mesh cover, a rear mesh cover detachably connected to the front mesh cover to form an intermediate cavity, and an air deflecting mesh component; the fan blade is arranged in the intermediate cavity; the air deflecting mesh component comprises a peripheral frame body and a plurality of air deflectors arranged in the peripheral frame body in a spacing manner, the rear mesh cover is detachably connected to the peripheral frame body, the front mesh cover is detachably mounted inside the peripheral frame body, and angles of the plurality of air deflectors are able to be adjusted;
   wherein connectors are arranged on two sides of the rear mesh cover; and one end of each connector is detachably connected to the peripheral frame body;
   wherein strip-shaped holes are formed in two sides of the peripheral frame body; a first elastic buckle used in conjunction with the strip-shaped hole is arranged at the one end of each connector; lengths of the first elastic buckles match lengths of the strip-shaped holes; and the first elastic buckles are arranged in the strip-shaped holes from an inner side of the peripheral frame body; and
   wherein an embedding part is perpendicularly arranged at one end, far from the first elastic buckle, of each connector, and a plurality of second elastic buckles are arranged on the embedding part; second insertion slots are formed in two sides of the rear mesh cover; bayonets are arranged on the second insertion slots; the embedding parts are arranged in the second insertion slots; and the second elastic buckles are arranged in the bayonets.

2. The fan according to claim 1, wherein skidproof stripes are arranged on an outer surface of the operating element.

3. The fan according to claim 1, further comprising a base connected to the fan main body, wherein the base is configured to be disposed on a placing surface and support the fan main body; and the circuit board comprises a control board and an adapter board electrically connected to the control board, both of the control board and the adapter board are arranged in the base; the stepless adjusting member is arranged on the adapter board; a first via hole corresponding to a position of the stepless adjusting member is formed in the base; the stepless adjusting member passes through the first via hole from an inside of the base and is connected to the operating element;

wherein the stepless adjusting member is a potentiometer or a rotary encoder switch, and the operating element is provided with a first insertion slot matched with a rotating handle in the rotary encoder switch, the rotating handle of the rotary encoder switch is at least partially arranged in the first insertion slot, and the rotating handle passes through the first via hole from the inside of the base and is connected to the operating element;

wherein the rotating handle is in an interference fit with the first insertion slot; an outer side wall of the rotating handle in the rotary encoder switch is at least partially a plane; two first convex blocks spaced apart from each other are formed on a side wall of the first insertion slot; and surfaces, away from a side wall surface of the first insertion slot, of the two first convex blocks are in contact with the plane.

4. The fan according to claim 3, wherein the base is rotatably connected to the fan main body.

5. The fan according to claim 4, further comprising a second motor arranged on the fan main body or in the base to drive the fan main body to rotate, wherein the second motor is electrically connected to the circuit board; and the stepless adjusting member is a press switch encoder;

a switch inside the press switch encoder is closed when the operating element is pressed; and the circuit board controls the second motor to rotate according to the closure of the switch in the press switch encoder.

6. The fan according to claim 5, wherein the second motor is arranged in the base; and an output shaft of the second motor is connected to the fan main body.

7. The fan according to claim 6, wherein a quantity of the fan blade is two, and the fan blades are spaced apart from each other; a quantity of the first motor is two; and each first motor is connected to one fan blade.

8. The fan according to claim 7, wherein the two fan blades comprise an upper fan blade and a lower fan blade which are spaced apart from each other.

9. A fan, comprising:

a fan main body, a circuit board, and an operating element, wherein the circuit board is provided with a stepless adjusting member; the operating element is connected to the stepless adjusting member; the fan main body comprises two first motors electrically connected to the circuit board, and two fan blades each connected to one of the first motors; and the circuit board adjusts power output to the first motors when the operating element rotates and operates the stepless adjusting member;

wherein the fan main body further comprises a front mesh cover and a rear mesh cover connected to the front mesh cover to form an intermediate cavity; the fan blades are arranged in the intermediate cavity; the first motors are arranged on the rear mesh cover;

a wiring slot is formed on a back surface of the rear mesh cover; a cover plate is set at a position of the wiring slot; and wherein two mounting slots for mounting the first motors are respectively formed in two ends of the wiring slot on the back surface of the rear mesh cover;

the cover plate comprises two first cover bodies used in conjunction with the two mounting slots, and a connecting plate body located between the two first cover bodies; the two first cover bodies are respectively clamped in the two mounting slots; and the connecting plate body is covered at a notch of the wiring slot.

10. The fan according to claim 9, wherein the front mesh cover comprises two circular mesh covers corresponding to positions of the two fan blades and an intermediate mesh cover located between the two circular mesh covers; the intermediate mesh cover is clamped to a front side of the rear mesh cover;

a plurality of second convex blocks are arranged on outer side walls of the circular mesh covers in a spacing manner; a clamping slot and a gap communicated with the clamping slot are arranged an inner side wall of the rear mesh cover; and the second convex blocks are rotatably arranged in the clamping slot after entering the gap.

11. The fan according to claim 9, further comprising a base connected to the fan main body, wherein the base is configured to be disposed on a placing surface and support the fan main body; and the circuit board comprises a control board and an adapter board electrically connected to the control board, both of the control board and the adapter board are arranged in the base; the stepless adjusting member is arranged on the adapter board;

wherein a first wiring hole is formed in a bottom of the wiring slot; a second wiring hole is formed in the base; the circuit board is connected to the first motors through a wire; and one end of the wire is arranged in the wiring slot through the second wiring hole and the first wiring hole in sequence; and wherein a second via hole communicated with the mounting slots is formed in an inner wall of the rear mesh cover; the first motors are mounted in the mounting slots with output shafts of the first motors being connected to the fan blades through the second via hole; and the first wiring hole is located on the mounting slots.

12. The fan according to claim 9, wherein the fan main body further comprises an air deflecting mesh component; the air deflecting mesh component comprises a pressing frame body, a connecting rod, a plurality of air deflectors arranged on the connecting rod from top to bottom in a spacing manner, and a peripheral frame body connected to the rear mesh cover;

the front mesh cover is located inside the peripheral frame body; two ends of the air deflectors are provided with rotating parts; the pressing frame body is connected to the peripheral frame body to form two columns of rotating holes spaced apart from each other; the rotating parts are inserted into the rotating holes; and a poke rod for adjusting an angle of the air deflectors is arranged on one side, far from the fan blades, of at least one of the air deflectors.

13. The fan according to claim 12, wherein connectors are arranged on two sides of the rear mesh cover; and one end of each connector is detachably connected to the peripheral frame body.

14. The fan according to claim 13, wherein strip-shaped holes are formed in two sides of the peripheral frame body; a first elastic buckle used in conjunction with a respective strip-shaped hole is arranged at the one end of each connector; lengths of the first elastic buckles match lengths of the strip-shaped holes; and the first elastic buckles are arranged in the strip-shaped holes from an inner side of the peripheral frame body.

15. The fan according to claim 14, wherein an embedding part is perpendicularly arranged at one end, far from the first elastic buckle, of each connector, and a plurality of second elastic buckles are arranged on the embedding part of each connector; second insertion slots are formed in two sides of the rear mesh cover; bayonets are arranged on the second insertion slots; the embedding parts are arranged in the second insertion slots; and the second elastic buckles are arranged in the bayonets.

16. A fan, comprising:

a fan main body, a circuit board, and an operating element, wherein the circuit board is provided with a stepless adjusting member; the operating element is connected to the stepless adjusting member; the fan main body comprises a first motor electrically connected to the circuit board, and a fan blade connected to the first motor; and the circuit board adjusts power output to the first motor when the operating element rotates and operates the stepless adjusting member;

wherein the fan main body further comprises a front mesh cover and a rear mesh cover connected to the front mesh cover to form an intermediate cavity; the fan blade is arranged in the intermediate cavity; the first motor is arranged on the rear mesh cover;

a wiring slot is formed on a back surface of the rear mesh cover; a cover plate is set at a position of the wiring slot; and wherein a mounting slot for mounting the first motor is respectively formed in an end of the wiring slot on the back surface of the rear mesh cover;

the cover plate comprises a first cover body used in conjunction with the mounting slot, and a connecting plate body connected to the first cover body; the first cover body is clamped in the mounting slot; and the connecting plate body is covered at a notch of the wiring slot.

* * * * *